United States Patent
Chen et al.

(10) Patent No.: US 10,678,989 B2
(45) Date of Patent: Jun. 9, 2020

(54) METHOD AND SYSTEM FOR SIGMA-BASED TIMING OPTIMIZATION

(71) Applicant: TAIWAN SEMICONDUCTOR MANUFACTURING COMPANY LTD., Hsinchu (TW)

(72) Inventors: Yen-Pin Chen, Taipei (TW); Tzu-Hen Lin, Hsinchu (TW); Tai-Yu Cheng, Pingtung (TW); Florentin Dartu, Austin, TX (US); Chung-Hsing Wang, Hsinchu County (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 60 days.

(21) Appl. No.: 15/874,478

(22) Filed: Jan. 18, 2018

(65) Prior Publication Data
US 2018/0247007 A1    Aug. 30, 2018

Related U.S. Application Data

(60) Provisional application No. 62/463,138, filed on Feb. 24, 2017.

(51) Int. Cl.
| | | |
|---|---|---|
| G06F 17/50 | (2006.01) | |
| G06F 30/394 | (2020.01) | |
| G06F 30/367 | (2020.01) | |
| G06F 111/20 | (2020.01) | |
| G06F 119/12 | (2020.01) | |

(52) U.S. Cl.
CPC .......... G06F 30/394 (2020.01); G06F 30/367 (2020.01); *G06F 2111/20* (2020.01); *G06F 2119/12* (2020.01)

(58) Field of Classification Search
CPC ............. G06F 17/5036; G06F 17/5077; G06F 2217/02; G06F 2217/84; G06F 17/50; G06F 2111/20; G06F 2119/12; G06F 30/367; G06F 30/394
See application file for complete search history.

(56) References Cited

U.S. PATENT DOCUMENTS

| | | | | |
|---|---|---|---|---|
| 8,806,412 B1 * | 8/2014 | Wang | .................. | G06F 17/5068 703/13 |
| 2010/0299645 A1 * | 11/2010 | Sakurai | ............... | G06F 17/5031 716/123 |
| 2016/0216316 A1 * | 7/2016 | Kim | .................... | G06F 17/5031 |
| 2018/0005708 A1 * | 1/2018 | Kawa | .................. | G06F 17/5072 |

* cited by examiner

*Primary Examiner* — Vuthe Siek
(74) *Attorney, Agent, or Firm* — WPAT, P.C., Intellectual Property Attorneys; Anthony King

(57) ABSTRACT

A method for timing optimization is disclosed. The method includes obtaining information on timing of paths in a chip, wherein the information includes a mean of slacks and a sigma of slacks of each of the paths, determining a sigma margin (SM) value each of the paths, the SM value being obtained by dividing the mean by the sigma, and determining that a first path of the paths is more critical than a second path of the paths, an SM value of the first path being smaller than that of the second path.

20 Claims, 11 Drawing Sheets

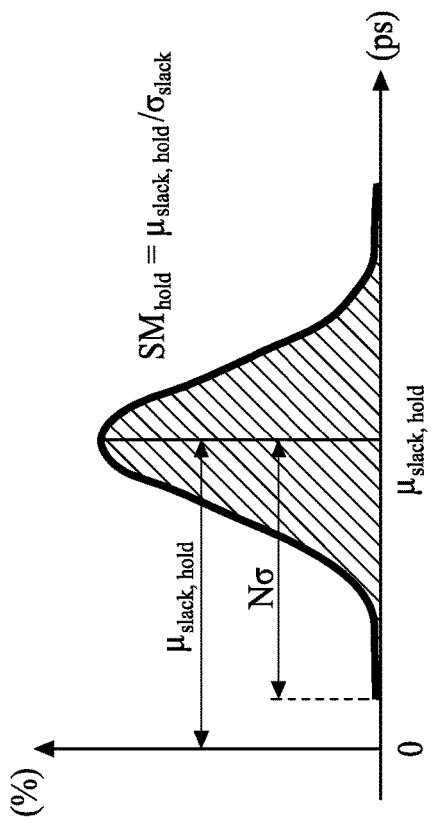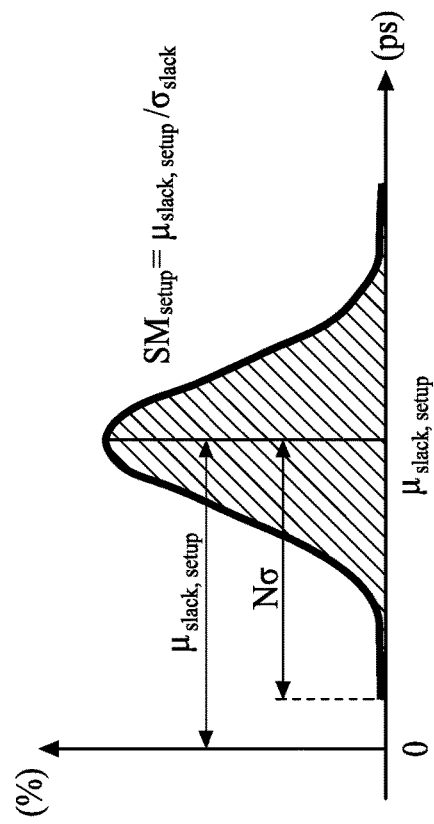

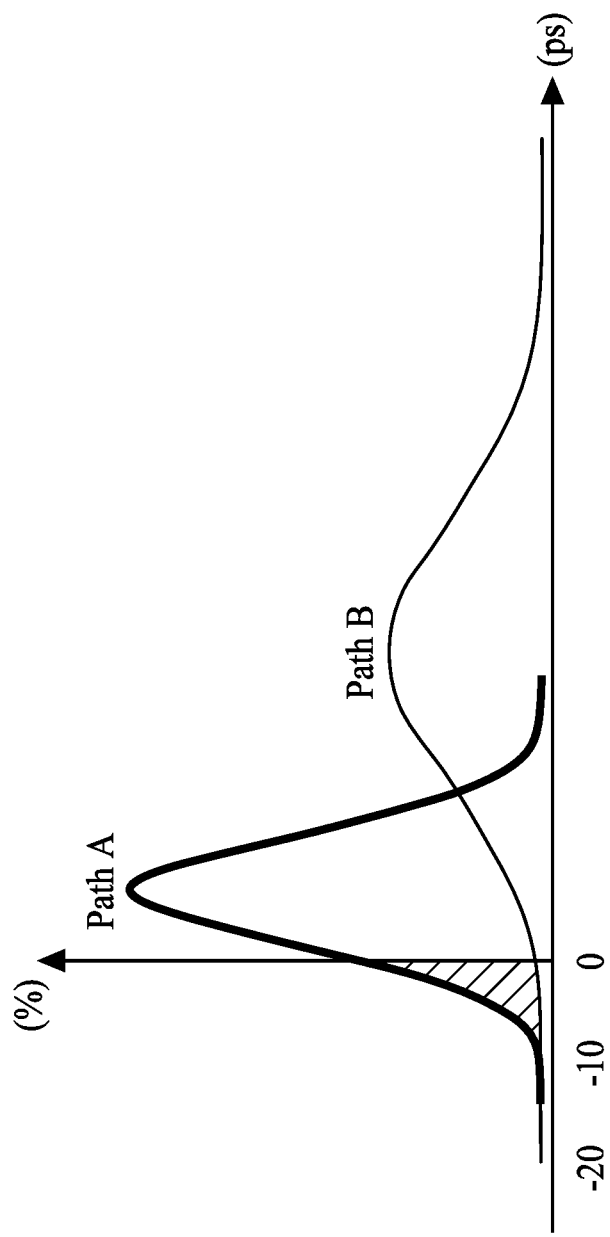

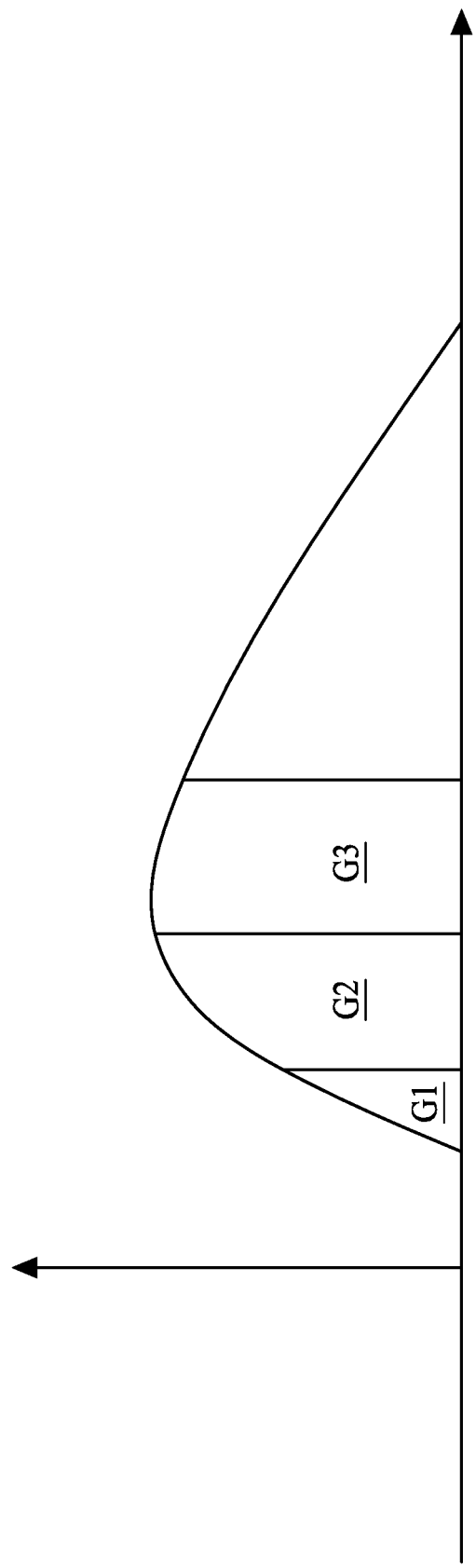

Path R: SM = 2.3    not waive
Path P: SM = 2.4    not waive
Path Q: SM = 2.8    not waive
Path Y: SM = 2.9    waive
Path X: SM = 2.91   waive
...

FIG. 5

METHOD AND SYSTEM FOR SIGMA-BASED TIMING OPTIMIZATION

CROSS REFERENCE TO RELATED APPLICATIONS

This application claims priority to U.S. provisional application Ser. No. 62/463,138, filed 24 Feb. 2017, which is incorporated herein by reference in its entirety.

BACKGROUND

At a stage of timing signoff and optimization in electronic design, designers or tools may use "slack" as a metric to represent timing criticality of paths. A path having a negative slack means the path does not meet timing requirements or violates the timing requirements. In addition, a larger negative slack means a more serious violation. Designers or tools may pay more attention to fix paths of a larger negative slack than paths of a smaller negative slack.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 2A and 2B are diagrams showing sigma margins (SM) of a hold slack and a setup slack, respectively, in accordance with some embodiments.

FIG. 3A is a plot diagram showing slack distribution of paths having different SM values.

FIG. 3B is a schematic diagram showing a method of determining the number of timing path in an SM group, in accordance with some embodiments.

FIG. 5 is a schematic diagram showing a method of determining whether to waive the fixing of a path, in accordance with some embodiments.

DETAILED DESCRIPTION

Figure 1:
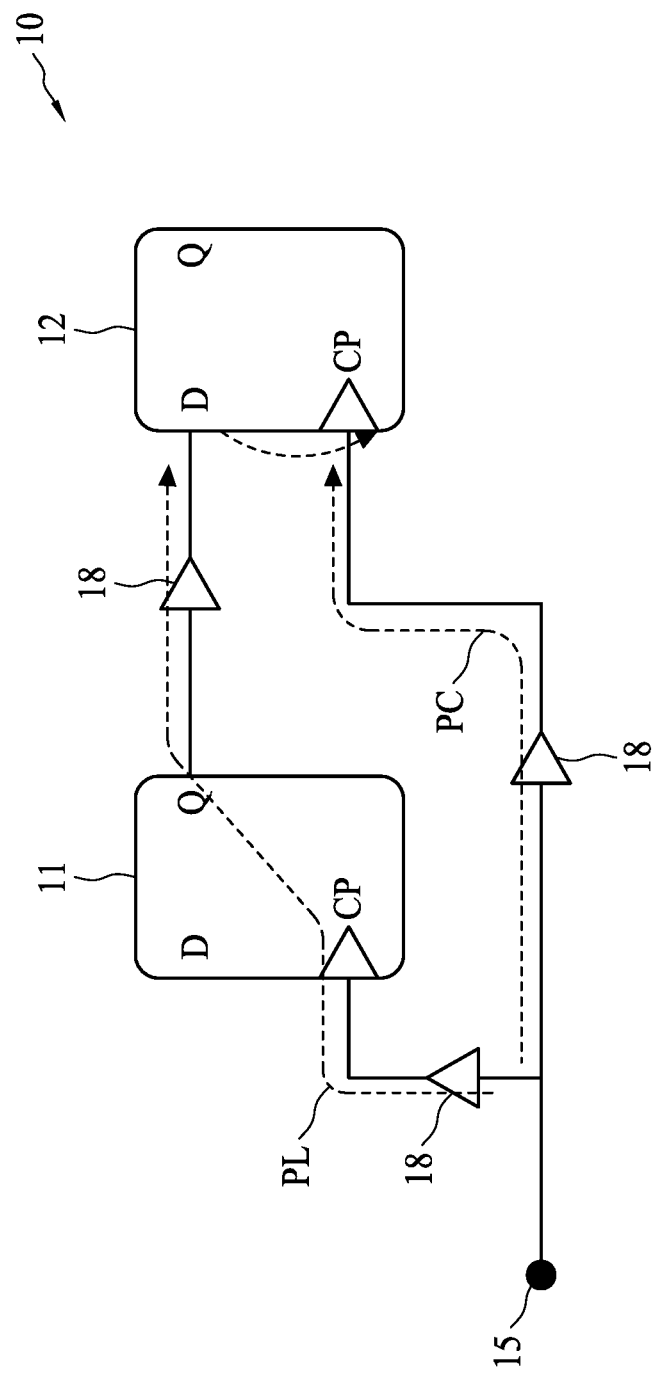
FIG. 1 is a schematic diagram showing timing paths in a chip.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a schematic diagram showing timing paths in a chip 10. There are huge numbers of logic paths inside a chip. For illustration, only exemplary paths are illustrated in the chip 10.

Referring to FIG. 1, the chip 10 includes a first gate 11 and a second gate 12. The exemplary timing paths include a launch path PL and a capture path PC. A launch path is a launch clock path which is responsible for launching data at a launch gate. A capture path is a capture clock path which is responsible for capturing the data at a capture gate. In the present embodiment, the first gate 11 is referred to a launch gate because it launches data to the second gate 12, and the second gate 12 is referred to a capture gate because it captures data from the first gate 11. The first gate 11 and the second gate 12 may include sequential elements such as a flip flop, register, latch or memory. Along the launch path PL and the capture path PC, combinational logics 18 are arranged. The combinational logics 18 may include buffers, inverters or clock dividers.

To facilitate the following discussion, some terms associated with the timing performance of the chip 10 are briefly defined below.

(1) launch time (Tlaunch): a time period for a clock signal to transmit from a clock source 15 to a clock pin CP of the first gate 11;

(2) data delay (Tdata): a time period for data to be transmitted from the first gate 11 to the second gate 12;

(3) capture time (Tcapture): a time period for the clock signal to transmit from the clock source 15 to a clock pin CP of the second gate 12;

(4) setup time (Tsetup): the minimum amount of time that data should be held steady before a clock event so that the data are readily sampled by the clock;

Accordingly, a setup time is a time period when input data is available and stable before an active edge of a clock pulse is applied. If data is not stable before Tsetup from an active edge of a clock pulse, then there is a setup violation.

(5) hold time (Thold): the minimum amount of time that data should be held steady after a clock event so that the data are readily sampled by the clock;

Accordingly, a hold time is a time period when data input is stable after an active edge of a clock pulse is applied. Likewise, if data is not stable after Thold from an active edge of a clock pulse, then there is a hold violation.

(6) data arrival time: the time required for data to travel through a data path;

(7) data required time: the time for a clock signal to travel through a clock path;

(8) setup slack: the difference between data required time and data arrival time, and specifically, data required time minus data arrival time;

(9) hold slack: the difference between data required time and data arrival time, and specifically, data arrival time minus data required time.

Slack concerns the timing performance of a chip. As an example of setup slack, a positive setup slack means a design is working at a specified frequency and has an extra margin. Zero setup slack means the design is exactly working at the specified frequency and no margin is available. A negative setup slack implies that the design fails to achieve the constrained frequency and timing, and thus incurs a setup violation. In addition, a critical path is a timing-sensitive functional path. The most critical path creates the longest delay in the chip. A timing critical path is one that does not meet the timing requirements. Since the timing of such path is critical, no additional gates are allowed to be added to the path, to prevent increasing delay of the critical path.

In some exiting approaches, slack is defined as the difference between the mean ($\mu$; expected value) of a slack distribution and the standard deviation ($\sigma$; sigma) of a combined distribution of all variation sources in a timing path. In addition, hold slack and setup slack can be expressed as follows.

$$Slack_{hold,N} = \mu_{slack,hold} - N \times \sigma_{slack} = (Tlaunch + Tdata - Tcapture - Thold) - N \times \sigma_{slack}; \text{ and}$$

$$Slack_{setup,N} = \mu_{slack,setup} - N \times \sigma_{slack} = (Tclock + Tcapture - Tlaunch - Tdata - Tsetup) - N \times \sigma_{slack},$$

where N is a number predetermined by a designer, and Tclock represents a clock period.

A designer or tool may prioritize paths in timing optimization based on the slack as above defined. However, slack is not considered an accurate measurement of timing criticality of paths. For example, a designer does not know how large a slack variation of a path from its slack. Also, a negative slack may result from a relatively small $\mu_{slack}$ or a relatively large $\sigma_{slack}$, or both, judging from the above-mentioned definitions of slack.

FIGS. 2A and 2B are diagrams showing sigma margins of a hold slack and a setup slack, respectively, in accordance with some embodiments.

Referring to FIG. 2A, the sigma margin (SM) of a hold slack, denoted as $SM_{hold}$, is defined in equation (1) below as the mean of hold slack ($\mu_{slack,\,hold}$) divided by the sigma of slack ($\sigma_{slack}$):

$$SM_{hold} = \frac{\mu slack,\, hold}{\sigma slack} = \frac{Tlaunch + Tdata - Tcapture - Thold}{\sigma slack} \qquad \text{equation (1)}$$

For convenience, it is assumed that the slacks of a timing path, either hold slack or setup slack, have a normal distribution (or a Gaussian distribution or a bell-shaped distribution). However, the present disclosure is not limited to any specific distributions. For example, the slack distribution may be a different distribution such as a log normal distribution. The horizontal axis represents slack time in picoseconds (ps), while the vertical axis represents the percentage (%) of a slack distribution. The sigma of slack ($\sigma_{slack}$) quantifies the amount of variation or distribution of a set of slack values. A small $\sigma_{slack}$ indicates that a set of slack values tend to be close to the mean of the set, while a large $\sigma_{slack}$ indicates that the set of slack values are spread out over a wider range of values.

Referring to FIG. 2B, similarly, the sigma margin (SM) of a setup slack, denoted as $SM_{setup}$, is defined in equation (2) below as the mean of setup slack ($\mu_{slack,\,setup}$) divided by the sigma of slack ($\sigma_{slack}$):

$$SM_{setup} = \frac{\mu slack,\, setup}{\sigma slack} = \frac{Tclock + Tcapture - Tlaunch - Tdata - Tsetup}{\sigma slack} \qquad \text{equation (2)}$$

In addition, it is determined that an SM value of a timing path is N if the zero slack point of the timing path falls on N times of sigma of slack ($N\sigma_{slack}$), N being a positive number. As a result, if the SM value of a certain path is greater than or equal to N, no timing violation occurs in the path. If, however, the SM value of a certain path is smaller than N, then there is a timing violation in the path. Accordingly, the number of timing paths having a negative slack in a design is tantamount to the number of paths having an SM value smaller than N. SM according to the present disclosure facilitates a designer to determine whether a path has a negative slack and whether a path is a critical path.

The probability of a path with an SM value of N to have a slack greater than or equal to zero is listed in Table 1 below. For convenience, only the cases of N being 1, 2, 3 and 4 are shown in the Table 1.

TABLE 1

| SM = N | the probability of slacks that fall within $N\sigma_{slack}$ from $\mu_{slack}$ | the probability of a path having a slack ≥0 | the probability of a path having a slack <0 |
| --- | --- | --- | --- |
| 1 | 68.27% | 68.27% + (1-68.27%)/2 = 84.13% | 15.87% |
| 2 | 95.45% | 95.45% + (1-95.45%)/2 = 97.72% | 2.28% |
| 3 | 99.73% | 99.73% + (1-99.73%)/2 = 99.87% | 0.13% |
| 4 | 99.994% | 99.994% + (1-99.994%)/2 = 99.997% | 0.003% |

For a normal slack distribution, one sigma on either side of the mean accounts for 68.27 percent of a set of slacks, two sigma from the mean accounts for 95.45 percent, three sigma accounts for 99.73 percent, and four sigma accounts for 99.994 percent. Since slacks on the right side of the mean is definitely greater than zero, in determining the probability of a path having a slack greater than or equal to zero, the probability of slacks on the left side of the mean, which accounts for a half of the distribution, is divided by two. For the values of N greater than four, the probabilities associated with the slack distribution (the second column in Table 1) and a path having a positive slack (the third column in Table 1) is relatively large and can be assumed to be 100%.

As can be seen in the fourth column of Table 1, a path having a smaller SM value is more likely to have a negative slack. SM thus facilitates a designer or a tool to determine whether a path is more critical than another.

FIG. 3A is a plot diagram showing slack distribution of paths A and B having different SM values.

Referring to FIG. 3A, the path A has a three-sigma (N=3; $3\sigma_{slack}$) of −10 ps, and the path B has a three-sigma of −20 ps. Moreover, the path A has an SM value of 1.5, and the path B has an SM value of 2. In some existing approaches that determine the criticality of a path based on slack, the path B is considered more critical than the path A because the path B has a more negative slack. However, as far as the probability of a path having a negative slack (the fourth column of Table 1) is concerned, the path A is considered more critical than the path B because the path A has a smaller SM value. Specifically, a path having a smaller SM value has a larger probability of negative slack, and therefore should have a higher priority to fix than another path having a smaller slack but larger SM. The SM approach is thus more accurate than the existing slack approach.

As a result, based on SM, the probability (or pass rate) of a path that can pass a setup and hold check can be quantized. Moreover, the pass rate (or timing yield) of a chip in a design can be estimated based on the pass rates all paths in the chip, as expressed in equation (3) below.

$$\text{pass\_rate}_{chip} = \Pi_{i=1}^{i=n} \text{pass\_rate}_{path i} = \text{pass\_rate}_{path1} \times \text{pass\_rate}_{path2} \times \ldots \times \text{pass\_rate}_{pathn} \quad \text{equation (3)}$$

where the operator $\Pi$ represents a continued multiplication.

For a design that contains four paths of which two have SM=3 and the other two have SM=4, the pass rate of the design is approximately 99.73%, as is calculated as follows:

$$(99.87\%)^2 \times (99.997)^2 = 99.73\%$$

in which 99.87% is the pass rate for a path having SM=3 and 99.997% is the pass rate for a path having SM=4, which can be found in the third column of Table 1. As a result, the timing yield of a design can be determined based on the pass rates of paths. On the other hand, given a predetermined timing yield, the number of paths having SM=i to achieve the predetermined timing yield requirement can be estimated, as expressed in equation (4) below:

$$\text{required\_yield} = \Pi_{i=-\infty}^{i=\infty} (SM=i)^{N(SM=i)} \quad \text{equation (4)}$$

where $N(SM=i)$ represents the number of paths having SM=i, and $P(SM=i)$ represents the pass rate of a path having SM=i.

For example, to achieve a timing yield of 99.9%, no paths having SM smaller than three are used, i.e., $N(SM \leq 3)=0$, and at most thirty-two paths having SM=4 can be used, i.e., $N(SM=4)=32$, as is calculated as follows.

$$99.9\% = (84.13\%)^0 \times (97.72)^0 \times (99.87)^0 \times (99.997)^{32}$$

There may be multiple choices or combinations for N(SM-i) that can achieve a given yield target. As a result, SM facilitates a designer or tool to determine the number of paths in each of SM=i groups. In addition, SM can be applied to an industrial statistical on-chip variation (SOCV) or parametric on-chip-variation flow to determine the number of violation paths with respect to a specific SM value. For example, given the target yield of 99.9%, the number of violation paths is zero when SM=4 is applied, and the number of paths having SM smaller than three is zero, i.e., $N(SM \leq 3)=0$. Also, the number of violation paths is not greater than thirty-two when SM=5 is applied, and the number of paths having SM=4 is not greater than thirty-two, i.e., $N(SM=4) \leq 32$.

FIG. 3B is a schematic diagram showing a method of determining the number of timing path in an SM group, in accordance with some embodiments.

Referring to FIG. 3B, timing paths are divided into groups based on their SM values. In the present embodiment, for example, a first group G1 includes timing paths that have an SM value ranging between 3 to 3.999, a second group G2 includes timing paths that have an SM value ranging between 4 to 4.999, and a third group G3 includes timing paths that have an SM value ranging between 5 to 5.999. Each of the groups G1, G2 and G3 has a specific pass rate. To determine the number of timing paths of, for example, the second group G2, $N(SM \geq 3)$ is determined and thus $N(SM<3)$ can be obtained. Next, $N(SM \geq 4)$ is determined and thus $N(SM<4)$ can be obtained. By subtracting $N(SM<4)$ from $N(SM<3)$, the number of timing paths of the second group G2 is determined.

Figure 4:
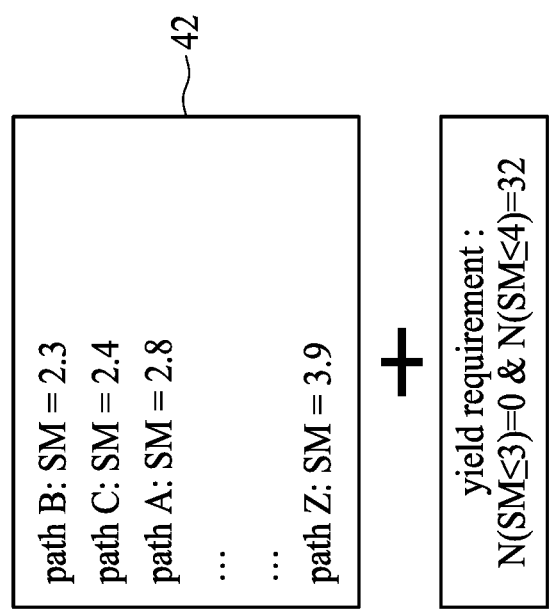
FIG. 4 is a schematic diagram showing a method of determining a sequence of fixing for paths, in accordance with some embodiments.

FIG. 4 is a schematic diagram showing a method of determining a sequence of fixing for paths, in accordance with some embodiments. In timing optimization engine of auto place and route (APR) or design sign-off stage, SM can be used as a basis to sort paths in order to prioritize the sequence of fixing. In implementation, a "critical range" that in existing approaches would be based on slack to select paths for APR fixing is set by SM instead of slack.

Referring to FIG. 4, a report on timing, such as a list 42 of critical paths sorted by SM is provided. In the present embodiment, the critical range is, for example, four sigma and paths having an SM value smaller than four are ranked in sequence in the list 42. As previously discussed, a path having a smaller SM is determined more critical and is given a higher priority on fixing. As a result, path B on top of the list 42, having the smallest SM, is fixed first. Subsequently, path C having the second smallest SM is fixed, and so forth. The method ensures a more critical path in variation point of view to obtain more resources during timing fixing. Exemplary methods of fixing a path include, but are not limited to, changing a cell associated with the path or adding combinational logics in the path. After fixing, the paths on the list 42 have an SM value not smaller than four.

In addition, in combination with the method for achieving a yield target, the method of sorting paths based on SM can limit the number of paths to be fixed. As shown in FIG. 4, in the present embodiment a yield target under the conditions of $N(SM \leq 3)=0$ and $N(SM \leq 4)=32$ is required. In that case, paths having an SM value smaller than three are fixed, while paths having an SM value between three and four may not be fixed. For example, in the present embodiment, the paths B, C and A are fixed, while the path Z is not fixed, which is cost efficient and flexible in particular in the case of limited resources.

FIG. 5 is a schematic diagram showing a method of determining whether to waive the fixing of a path, in accordance with some embodiments.

Referring to FIG. 5, a list 52 of violation paths sorted by SM is provided. In the present embodiment, paths R, P and Q having a worse case of SM are not waived fixing, and paths Y and X having a relatively large SM are waived fixing. A threshold SM may be used to facilitate determining which paths are to be waived fixing. As a result, this method is also cost efficient and flexible in particular in the case of limited resources. Yield loss from waived paths can be calculated by the equation (3).

Figure 6:
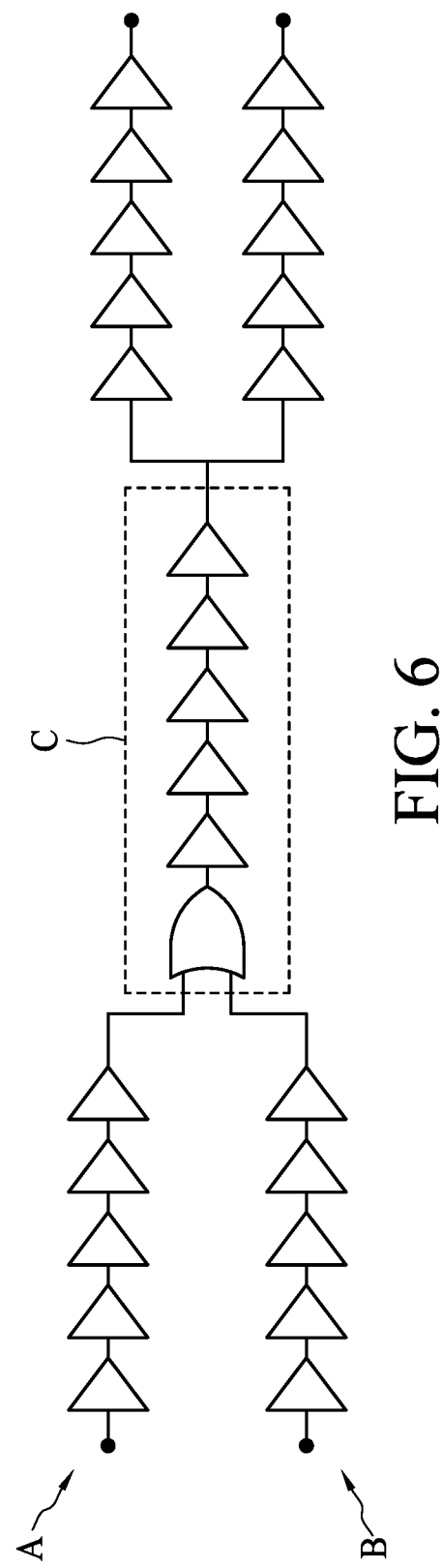
FIG. 6 is a schematic diagram of paths having a portion in common, in accordance with some embodiments.

FIG. 6 is a schematic diagram of paths A and B having a portion in common, in accordance with some embodiments.

Referring to FIG. 6, a first path A and a second path B overlap each other in a portion C. Due to the overlapped portion C, the first path A and the second path B are correlated with each other. In determining the criticality of paths having an overlapped portion, the degree of correlation is taken into consideration. Correlation between paths is defined as follows.

$$Wcorrelation = \frac{\sigma_C^2}{\sqrt{\sigma_C^2 + \sigma_A^2} \times \sqrt{\sigma_C^2 + \sigma_{CB}^2}}$$

where Wcorrelation represents a weight of correlation, $\sigma_A$, $\sigma_B$ and $\sigma_C$ represent sigma values of non-overlapped portion in the first path A, non-overlapped portion in the second path B, and the overlapped portion C, respectively. In the case that the first path A and the second path B are totally independent of each other and thus no such overlapped portion C exists, $\sigma_C$ is zero. As a result, Wcorrelation is zero. In the case that the first path A and the second path B completely overlap each other and thus no such non-overlapped portions in the first path A and the second path B exist, $\sigma_A$ and $\sigma_B$ are zero and $\sigma_C$ is one. As a result, Wcorrelation is one. A correlated path rate $P_{corr,\ AB}(SM=i)$ replaces the pass rate $P_A(SM=i)$ of the first path A and the pass rate $P_B(SM=i)$ of the second path B in the above equations (3) and (4). In addition, the correlated path rate $P_{corr,\ AB}(SM=i)$ is larger than a multiplication product of the pass rates $P_A(SM=i)$ and $P_B(SM=i)$. By taking correlation between the first path A and the second path B into consideration, the above equations (3) and (4) become more accurate.

In an embodiment, to simplify calculation, if an overlapped portion between the first path A and the second path B is greater than a predetermined threshold, the pass rates of the first path A and the second path B are considered equal to each other.

Figure 7:
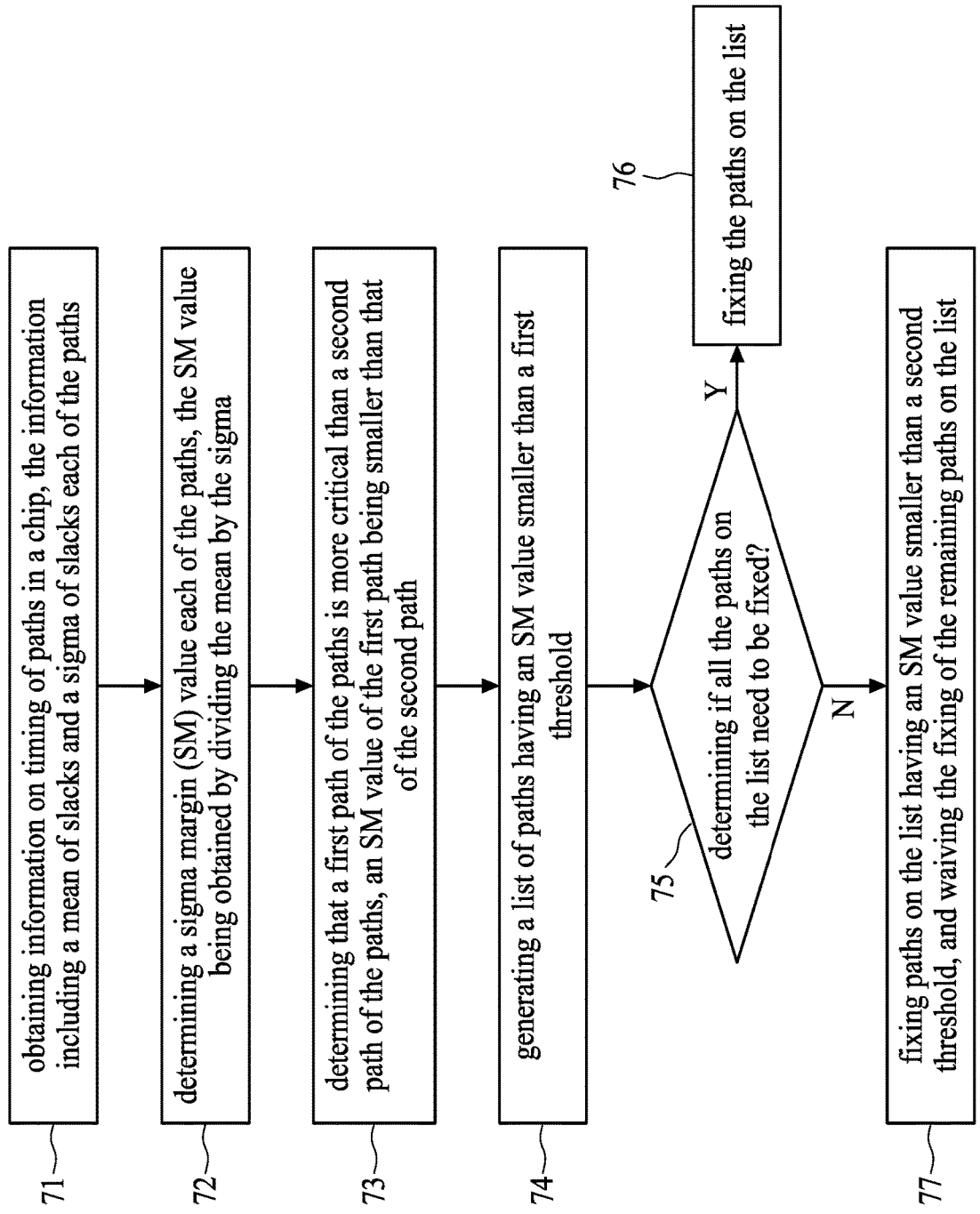
FIG. 7 is a flow diagram showing a method of timing optimization, in accordance with some embodiments.

FIG. 7 is a flow diagram showing a method of timing optimization, in accordance with some embodiments.

Referring to FIG. 7, in operation 71, information on timing of paths in a chip is obtained, for example, from a timing library. The information includes a mean of slack ($\mu_{slack}$) of each of the paths and a sigma of slack ($\sigma_{slack}$) of each of the paths. The mean of slack may further include the mean of hold slack and the mean of setup slack.

In operation 72, a sigma margin (SM) value each of the paths is determined. The SM value of a path is defined by dividing the mean of the path by the sigma of the path. The SM value is used to determine the criticality of the paths, and identify which path is more critical than another. Also, the SM value is used to prioritize violation paths in order of fixing so that a path having a smaller SM value is fixed prior to one having a larger SM value. In addition, the SM value of a path is positively related to a pass rate of the path. As a result, a timing yield of a chip can be estimated based on a multiplication product of the pass rates of the paths. Furthermore, a combined pass rate of correlated paths is larger than a multiplication product of individual pass rates, when independent of each other, of the paths.

In operation 73, it is determined that a first path of the paths is more critical than a second path of the paths, if an SM value of the first path is smaller than that of the second path.

In operation 74, a list of paths having an SM value smaller than a first threshold is generated. In an embodiment, the list may be generated by sorting the paths according to their SM values. The first threshold may include a critical range or a predetermined SM value.

In operation 75, it is determined if all the paths on the list need to be fixed. If affirmative, then in operation 76 the paths on the list are fixed. In an embodiment, these paths are fixed until their SM values reach the first threshold. If not all the paths on the list need to be fixed, for example, due to limited resources, then in operation 77 paths on the list having an SM value smaller than a second threshold are fixed, while the remaining paths on the list are not fixed. The second threshold is smaller than the first threshold. In some embodiments, a path may be fixed by changing a cell associated with the path. Alternatively, a path may be fixed by adding combinational logics in the path.

Figure 8:
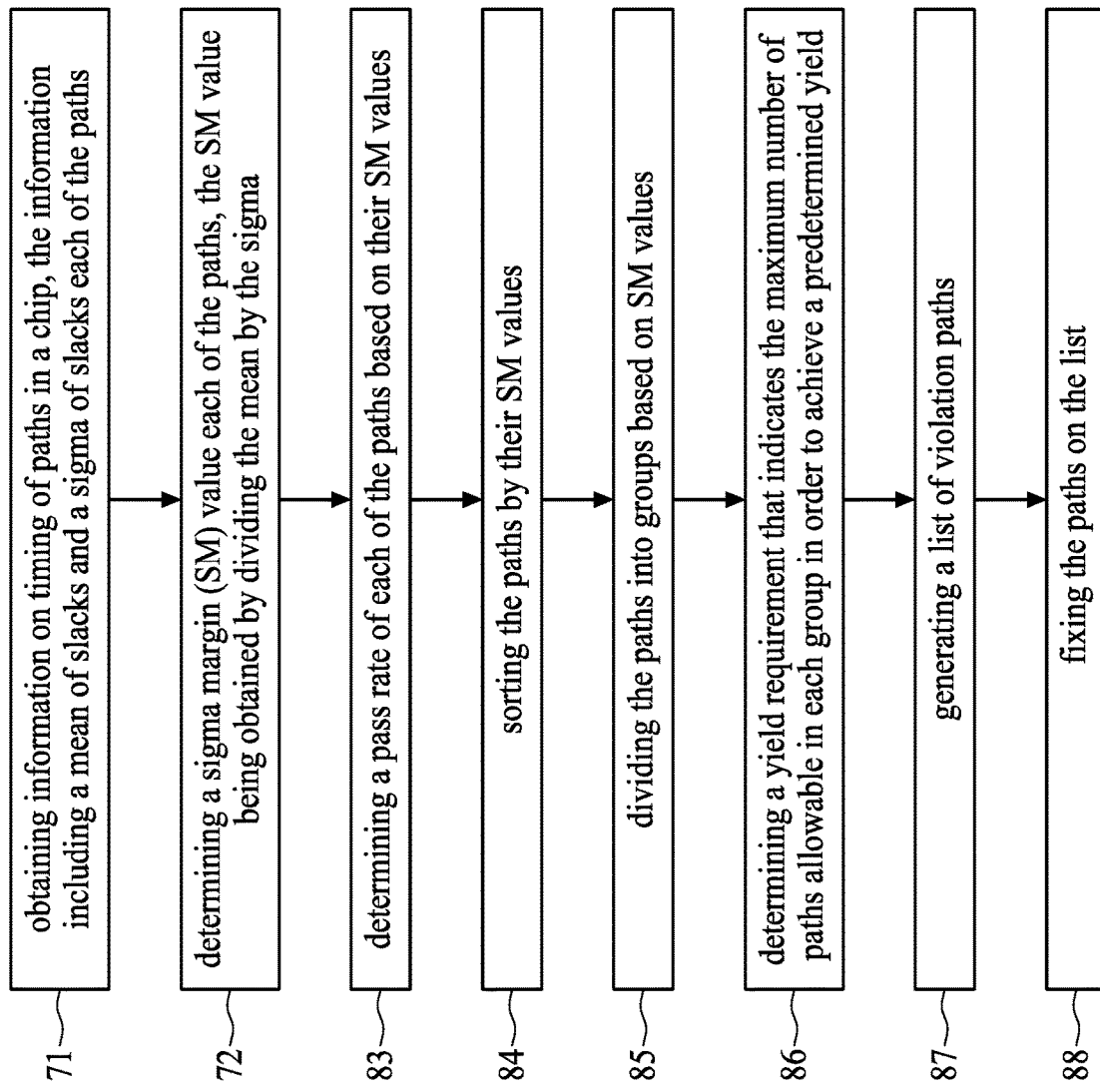
FIG. 8 is a flow diagram showing a method of timing optimization, in accordance with some embodiments.

FIG. 8 is a flow diagram showing a method of timing optimization, in accordance with some embodiments.

Referring to FIG. 8, operations 71 and 72 have been discussed with reference to FIG. 7. In operation 83, a pass rate of each of the paths is determined based on their SM values. The relationship between SM value and pass rate of a path can be found, for example, in Table 1.

In operation 84, the paths are sorted by their SM values. Next, in operation 85, the paths are divided into groups based on their SM values. Each of the groups has a specific SM value or a specific range of SM values so that the SM value of a path in one group is different from that in another group. Since an SM value is related to pass rate, each group of paths has a specific pass rate.

In operation 86, a yield requirement that indicates the maximum number of paths allowable in each group is determined in order to achieve a predetermined yield. The predetermined yield is a yield target predetermined by a designer. In determining the yield requirement, the pass rate of each group is used. Moreover, a combined pass rate of correlated paths is larger than a multiplication product of individual pass rates, when independent of each other, of the paths.

In operation 87, a list of violation paths that fail to satisfy the yield requirement is generated. Subsequently, in operation 88 paths on the list are fixed. Specifically, paths of a group having a smaller SM value are fixed prior to paths of another group having a larger SM value.

Figure 9:
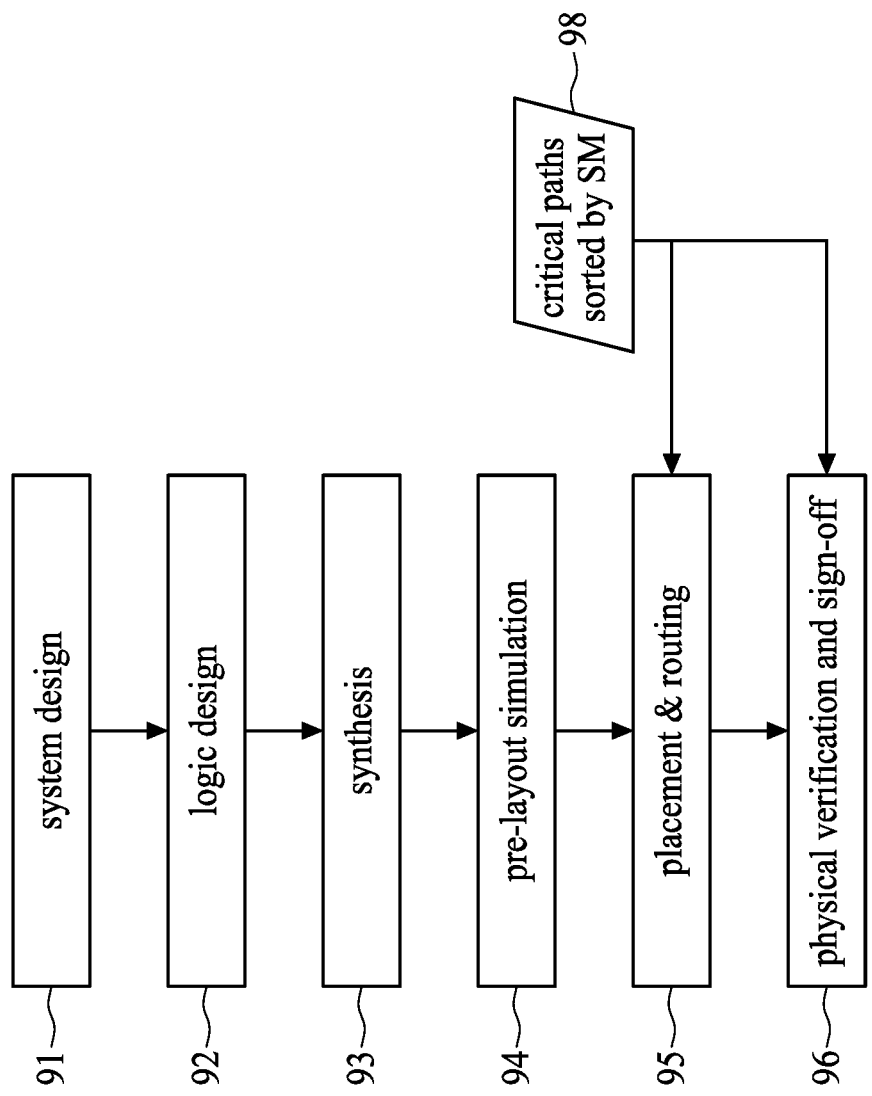
FIG. 9 is a flow diagram of a design flow for an integrated circuit (IC), in accordance with some embodiments.

FIG. 9 is a flow diagram of a design flow for an integrated circuit (IC), in accordance with some embodiments.

Referring to FIG. 9, the design flow, employed for designing semiconductor chips, utilizes one or more electronic design automation (EDA) tools to facilitate design operations. For example, with respect to timing optimization, a static timing analysis (STA) tool may be used to analyze paths in the chip. A workstation or personal computer is used in executing the tools to accomplish the design flow. The design flow comprises a system design stage 91, a logic design stage 92, a synthesis stage 93, a pre-layout simulation stage 94, a placement and routing stage 95, and a physical verification and sign-off stage 96.

Initially, at the system design stage 91, a systematic architecture for the chip of interest is provided with a high level description. In that stage, each function of the chip along with performance requirements is determined according to a design specification. Those functions are usually represented by respective schematic functional modules or blocks. In addition, an optimization or performance trade-off may be sought in order to achieve the design specification with affordable cost and power.

At the logic design stage 92, the functional modules or blocks are described in a register transfer level (RTL) using a hardware description language. The language tools are usually available from commercial software, for example, Verilog or VHDL. A preliminary functionality check is performed at the logic design stage 92 to verify if the implemented functions conform to the specification set forth in the system design stage 91.

Subsequently, at the synthesis stage 93, the modules in RTL descriptions are converted into a netlist data where circuit structure, for example, logic gates and registers, in each function module are established. Mapping of such logic gates and registers to available cells in a standard cell library may be conducted. Further, the netlist data is offered to describe the functional relationship of the chip devices in a gate-level. The netlist data is transformed from the gate-level view to a transistor-level view. The term "netlist" used herein refers to both graphical-based representation such as a schematic and/or a text-based representation of a circuit.

Then, the gate-level netlist data is verified at the pre-layout simulation stage 94. At the verification process of the stage 94, if some of the functions fail the verification in the simulation, the design flow may be paused temporarily and go back to the stage 91 or 92 for further correction or modification. After the pre-layout simulation stage 94, the IC chip design has passed a preliminary verification and completed the front-end design process. Subsequently, a back-end physical design process will follow.

At the placement and routing stage 95, a physical architecture representing the circuits determined during the front-end process is implemented. The detailed structure and associated geometry of each component and device are determined in the placement operation, and interconnects among different components are routed subsequent to the placement operation. Moreover, the placement operation involves deciding where to place each IC chip component and circuitry in a limited amount of space, and the routing operation decides the actual wiring of connecting lines. Both operations of placement and routing are performed to meet a design rule check (DRC) deck, such as from the chip manufacturing facility, so as to fulfill the manufacturing criteria of the chip. After the placement and routing stage 95, a placed-and-routed layout data is created and a netlist with placement and routing data is generated accordingly.

At a physical verification and signoff stage 96, layout-versus-schematic (LVS) is performed on a physical netlist generated from the design layout to ensure correspondence of the design layout to the gate-level netlist. Further, design rule check (DRC) is performed on the design layout to ensure the design clean of, for example, electrical issues and lithographic issues for manufacturing. Incremental fixing can be performed to achieve final signoff of the IC chip design before tape-out.

Apart from the stages 91 through 96, a list 98 of critical paths or violation paths sorted by SM may be generated in accordance with the methods described and illustrated with reference to FIGS. 7 and 8, and provided to the placement and routing stage 95 and the physical verification and signoff stage 96 for fixing.

The design flow illustrated in FIG. 9 is exemplary. The method and system for timing optimization are applicable to the design flow or other design flows including other sequences of the stages or operations, partition of the stages, or additional stages before, between or after the stages shown.

Figure 10:
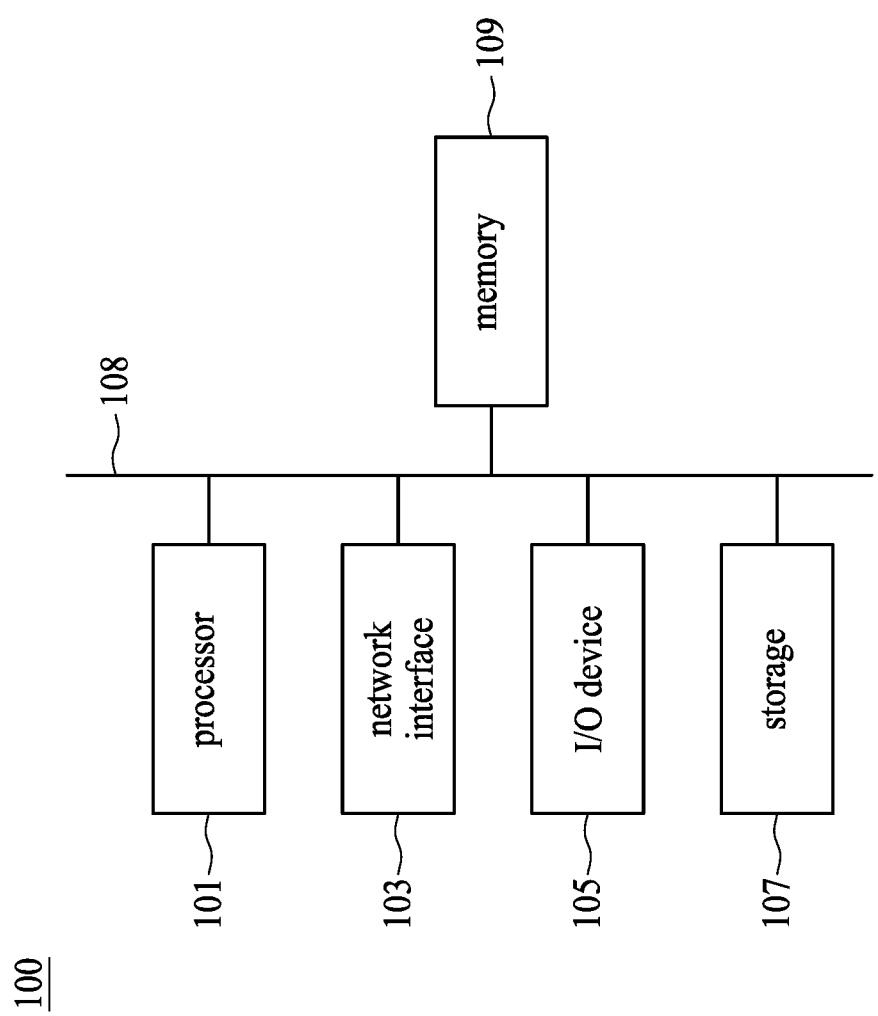
FIG. 10 is a block diagram of a system for timing optimization, in accordance with some embodiments.

FIG. 10 is a block diagram of a system 100 for timing optimization, in accordance with some embodiments.

Referring to FIG. 10, the system 100 includes a processor 101, a network interface 103, an input and output (I/O) device 105, a storage device 107, a memory 109, and a bus or network 108. The bus 108 couples the network interface 103, the I/O device 105, the storage device 107 and the memory 109 to the processor 101.

The processor 101 is configured to execute program instructions that include a tool configured to perform a method as described and illustrated with reference to FIG. 7 or 8 or both. Accordingly, the tool is configured to execute the operations including obtaining information on timing of paths in a chip, wherein the information includes a mean of slacks and a sigma of slacks of each of the paths, determining a sigma margin (SM) value each of the paths, the SM value being obtained by dividing the mean by the sigma, and determining that a first path of the paths is more critical than a second path of the paths, an SM value of the first path being smaller than that of the second path.

Moreover, the tool is also configured to execute the operations including obtaining information on timing of paths in a chip, the information includes a mean of slacks and a sigma of slacks of each of the paths, determining a sigma margin (SM) value each of the paths, the SM value being obtained by dividing the mean by the sigma, dividing the paths into groups based on SM values, an SM value of a path in one of the groups being different from that of a path in another one of the groups, and determining a yield requirement that indicates the maximum number of paths allowable in each group in order to achieve a predetermined yield.

The network interface 103 is configured to access program instructions and data accessed by the program instructions stored remotely through a network (not shown).

The I/O device 105 includes an input device and an output device configured for enabling user interaction with the system 100. In some embodiments, the input device comprises, for example, a keyboard, a mouse, and other devices. Moreover, the output device comprises, for example, a display, a printer, and other devices.

The storage device 107 is configured for storing program instructions and data accessed by the program instructions. In some embodiments, the storage device 107 comprises, for example, a magnetic disk and an optical disk.

The memory 109 is configured to store program instructions to be executed by the processor 101 and data accessed by the program instructions. In some embodiments, the memory 109 comprises a random access memory (RAM) and/or some other volatile storage device and/or read only memory (ROM) and/or some other non-volatile storage device.

In some embodiments, the present disclosure provides a method of timing optimization. The method includes obtaining information on timing of paths in a chip, the information including a mean of slacks and a sigma of slacks of each of the paths, determining a sigma margin (SM) value each of the paths, the SM value being obtained by dividing the mean by the sigma, and determining that a first path of the paths is more critical than a second path of the paths, an SM value of the first path being smaller than that of the second path.

In some embodiments, the present disclosure also provides a method of timing optimization. The method includes obtaining information on timing of paths in a chip, the information including a mean of slacks and a sigma of slacks of each of the paths, determining a sigma margin (SM) value each of the paths, the SM value being obtained by dividing the mean by the sigma, dividing the paths into groups based on SM values, an SM value of a path in one of the groups being different from that of a path in another one of the groups, and determining a yield requirement that indicates the maximum number of paths allowable in each group in order to achieve a predetermined yield.

In some embodiments, the present disclosure provides a system for timing optimization. The system includes one or more processors and one or more programs including instructions which, when executed by the one or more processors, cause the system to obtain information on timing of paths in a chip, the information including a mean of slacks and a sigma of slacks of each of the paths, determine a sigma margin (SM) value each of the paths, the SM value being obtained by dividing the mean by the sigma, and determine that a first path of the paths is more critical than a second path of the paths, an SM value of the first path being smaller than that of the second path.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
    obtaining information on timing of paths in a chip, the information including a mean of slacks and a sigma of slacks of each of the paths;
    determining a sigma margin (SM) value each of the paths, the SM value being obtained by dividing the mean by the sigma; and
    determining that a first path of the paths is more critical than a second path of the paths, an SM value of the first path being smaller than that of the second path.
2. The method according to claim 1 further comprising:
    generating a list of paths having an SM value smaller than a first threshold; and
    fixing the paths on the list so that the SM values of the paths on the list reach the first threshold.
3. The method according to claim 2 further comprising:
    fixing the first path prior to fixing the second path.
4. The method according to claim 2, wherein fixing the paths on the list comprises at least one of:
    changing a cell associated with a path; and
    adding combinational logics in the path.
5. The method according to claim 1 further comprising:
    generating a list of paths having an SM value smaller than a first threshold; and
    fixing paths on the list having an SM value smaller than a second threshold, and waiving the fixing of the remaining paths on the list.
6. The method according to claim 5, before generating a list of paths, further comprising:
    sorting the paths by their SM values.
7. The method according to claim 1, after determining a sigma margin (SM) value each of the paths, further comprising:
    determining a pass rate of each of the paths based on the SM value of the each path.
8. The method according to claim 7 further comprising:
    estimating a timing yield of the chip based on pass rates of the paths.
9. The method according to claim 7 further comprising:
    identifying correlated paths in the paths; and
    determining that a combined pass rate of the correlated paths is larger than a multiplication product of the pass rate of each of the correlated paths.
10. A system, comprising one or more processors and one or more programs including instructions which, when executed by the one or more processors, cause the system to:
    obtain information on timing of paths in a chip, the information including a mean of slacks and a sigma of slacks of each of the paths;
    determine a sigma margin (SM) value each of the paths, the SM value being obtained by dividing the mean by the sigma; and
    determine that a first path of the paths is more critical than a second path of the paths, an SM value of the first path being smaller than that of the second path.
11. The system according to claim 10, further comprising instructions which, when executed by the one or more processors, cause the system to:
    generate a list of paths having an SM value smaller than a first threshold; and
    fix the paths on the list so that the SM values of the paths on the list reach the first threshold.
12. The system according to claim 10, further comprising instructions which, when executed by the one or more processors, cause the system to:
    fix the first path prior to fixing the second path.
13. The system according to claim 10 further comprising instructions which, when executed by the one or more processors, cause the system to:
    generate a list of paths having an SM value smaller than a first threshold; and
    fix paths on the list having an SM value smaller than a second threshold, and waive the fixing of the remaining paths on the list.
14. A method, comprising:
    obtaining information on timing of paths in a chip, the information including a mean of slacks and a sigma of slacks of each of the paths;
    determining a sigma margin (SM) value for each of the paths, wherein the SM value is inversely proportional to the sigma of slacks and directly proportional to the mean of slacks; and
    determining that a first path of the paths is more critical than a second path of the paths, an SM value of the first path being smaller than that of the second path.
15. The method according to claim 14, wherein determination of the SM value comprises:
    dividing the mean by the sigma.
16. The method according to claim 14, further comprising:
    generating a list of paths having an SM value smaller than a first threshold; and
    fixing the paths on the list so that the SM values of the paths on the list reach the first threshold.
17. The method according to claim 16, further comprising:
    fixing the first path prior to fixing the second path.
18. The method according to claim 16, wherein fixing the paths on the list comprises at least one of:
    changing a cell associated with a path; and
    adding combinational logics in the path.
19. The method according to claim 14, further comprising:
    generating a list of paths having an SM value smaller than a first threshold; and
    fixing paths on the list having an SM value smaller than a second threshold, and waiving the fixing of the remaining paths on the list.
20. The method according to claim 19, before generating a list of paths, further comprising:
    sorting the paths by their SM values.

* * * * *